United States Patent [19]

Kluger

[11] 4,352,920
[45] Oct. 5, 1982

[54] EPOXY RESIN COMPOSITIONS

[75] Inventor: Edward W. Kluger, Pauline, S.C.

[73] Assignee: Milliken Research Corporation, Spartanburg, S.C.

[21] Appl. No.: 230,719

[22] Filed: Feb. 2, 1981

[51] Int. Cl.³ .................. C08G 59/50; C08G 59/64
[52] U.S. Cl. .................................. 528/111; 528/407; 564/504; 564/508
[58] Field of Search .............. 564/504, 508; 528/111, 528/407

[56] References Cited

U.S. PATENT DOCUMENTS

| | | | |
|---|---|---|---|
| 3,377,383 | 4/1968 | Farkas et al. | 528/407 X |
| 4,049,716 | 9/1977 | Collet | 564/508 X |
| 4,216,171 | 8/1980 | Soula et al. | 564/504 |

OTHER PUBLICATIONS

Lee & Neville, *Handbook of Epoxy Resins*, McGraw-Hill, N.Y., 1967, pp. 1-2.

*Primary Examiner*—Earl A. Nielsen
*Attorney, Agent, or Firm*—H. William Petry; Terry T. Moyer

[57] ABSTRACT

Epoxy resin compositions are provided containing aminoalkoxy compounds of the formula:

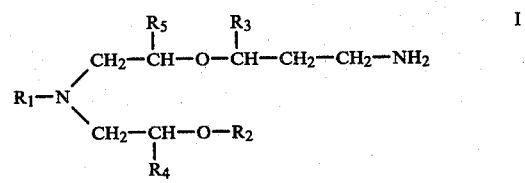

wherein $R_1$ and $R_2$ are selected from H and

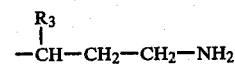

and $R_3$, $R_4$ and $R_5$ are all independently selected from H and a lower alkyl group having from 1 to about 6 carbon atoms. Also provided are methods for curing epoxy resins where aminoalkoxy curing agents may be employed.

6 Claims, No Drawings

EPOXY RESIN COMPOSITIONS

The present invention relates to methods for curing epoxy resins wherein aminoalkoxy compounds are employed as a curing agent. The present invention also relates to epoxy resin compositions containing aminoalkoxy compounds as epoxy curing agents.

Epoxy resins were first introduced commercially in the United States in about 1950, and since then their use has grown rapidly. Epoxy resins may be broadly defined as resinous intermediate materials which are characterized by the presence of the epoxy group

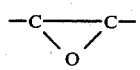

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents are available or known to have utility as curing agents or hardeners which may be added to epoxy resins to convert them to thermoset materials. It is also known that in the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-, urea-, and melamine-formaldehyde resins; and (3) amine type, e.g., aliphatic and aromatic amines, polyamides, tertiary amines, and amine adducts. The novel aminoalkoxy compounds of the present invention may be employed as the third type, namely the amine type, of epoxy curing agent.

The aminoalkoxy compounds of the present invention may be represented by the following structural formula:

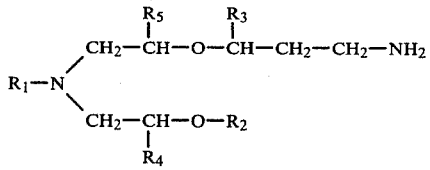

wherein $R_1$ and $R_2$ are selected from H and

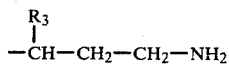

and $R_3$, $R_4$ and $R_5$ are all independently selected from H and a lower alkyl group having from 1 to about 6 carbon atoms. Preferably in the above structural formula $R_1$ and $R_2$ are independently selected from

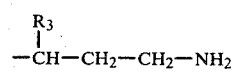

Even more preferably the ethylenically unsaturated nitrile employed to prepare the novel compounds is acrylonitrile so that $R_3$ is H. The $R_4$ and $R_5$ substituents are preferably H.

The present invention also relates to the use of such compounds as epoxy curing agents and to epoxy resin compositions which contain 100 parts by weight of at least one epoxy resin and from about 15 parts to about 50 parts, preferably about 20 parts to about 30 parts by weight of the aminoalkoxy compounds of the invention. Such cured products have good flexibility, high heat distortion temperatures and excellent solvent resistance.

The aminoalkoxy compounds of the present invention may be prepared quite conveniently by a two-step process involving, as the first step cyanoalkylation of a dialkanolamine of the formula:

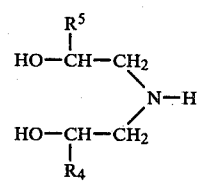

wherein $R_4$ and $R_5$ are as indicated above. Such cyanoalkylation is described and claimed in a copending, commonly assigned United States patent application having the same filing date as the present application, entitled "Tricyanoalkanolamines and Process for Selective Cyanoalkylation of Dialkanolamines", Edward W. Kluger. That application is incorporated herein by reference. The cyanoalkylated products prepared according to applicant's copending application may, for the purposes of the present application, be represented as follows:

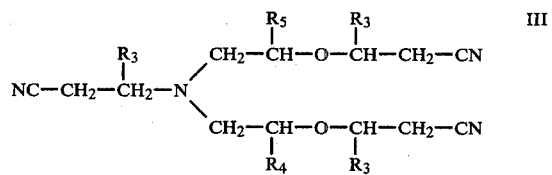

wherein $R_3$, $R_4$ and $R_5$ are as indicated above. As indicated above and in my copending application the preferred cyanoalkylating agent is acrylonitrile so that in the above structural formula $R_3$ is H. Also, $R_4$ and $R_5$ are preferably both H, so that such preferred compound is bis(-3-aminopropoxy)-N-(-3-aminopropyl)diethanolamine. For convenience the second step in the preparation of the invention will be described with particular reference to this preferred compound although it is to be understood that the invention is not to be limited thereby.

The second step in the preparation of the compounds of the present invention involves hydrogenation of the cyanoalkylated dialkanolamine (Structure III). Such hydrogenation may be accomplished in general with hydrogen and ammonia in the presence of a suitable metal catalyst. Such hydrogenation may further be accomplished either in the presence of a solvent or in the absence thereof. The products produced according to such hydrogenation may include the corresponding tetra-amine, say if all the cyano groups are reduced and there is no cleavage, tri-amines, if one functional group is cleaved during the hydrogenation and so forth. In essence it is believed that virtually all of the amine compounds of the invention (Structure I) may be produced pursuant to such hydrogenation depending upon the extent of cleavage that occurs in the hydrogenation reaction. Preferably, however, the product composition will contain a predominant portion, e.g., at least about 80 percent and preferably at least about 90 percent of the tetra-amine, that is the compound represented by Structure I wherein $R_1$ and $R_2$ are both

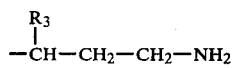

where $R_3$ has the value indicated above.

A preferred embodiment of the invention will be set forth with particular reference to the cyanoethylated intermediate bis(2-cyanoethoxy)-N-(-2-cyanoethyl)diethanolamine. Reduction of this compound may be accomplished according to the invention to produce the corresponding tetra-amine in high yield as shown by the following equation:

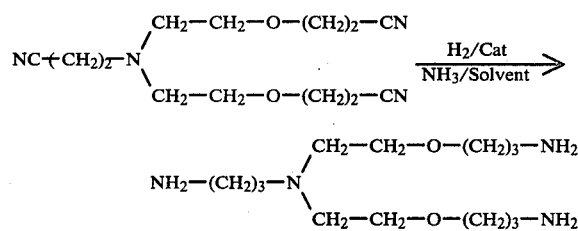

The temperature at which the above described reduction of aminotrinitrile is carried out can vary widely. However, generally the temperature may be within a range of from about 30°–150° C. and preferably in the range of 80°–125° C. Likewise, the period of time required for the reaction to go to substantial completion can vary widely, such being dependent on the hydrogen pressure and the particular catalyst employed as well as the temperature at which such reaction is carried out. Generally, however, the reaction proceeds to completion when the reactants are contacted at the required temperature for from about 0.5 to about 4 hours.

Pressures in the range of about 1000 to about 5000 psi may be used to accomplish the reduction. While pressure in the higher range (2100–5000 psi) can be used and may be advantageous, the preferable range of pressure is 1000–2000 psi. The use of ammonia in this reduction is for the purpose of maintaining high yields of the corresponding tetramine. The presence of ammonia may serve to inhibit formation of secondary amines. The amount of ammonia used may vary from 5 moles of ammonia per mole of aminotrinitrile to 30 moles per mole of aminotrinitrile. Preferably 12 to about 20 moles of ammonia are used per mole of tetranitrile.

The hydrogenation of the aminotrinitrile may be carried out in the presence or absence of a solvent. When solvent is employed, any suitable solvent which will not interfere with the desired hydrogenation can be employed, such as cycloaliphatic ethers, e.g., dioxane, tetrahydrofuran, and the like and higher boiling hydrocarbons, e.g., hexane, cyclohexane, heptane, decane, toluene, xylenes, and the like and alcohols, e.g., methyl alcohol, ethyl alcohol, isopropyl alcohol, isobutyl alcohol and the like.

In carrying out the reduction of the aminotrinitrile any suitable reduction catalyst can be employed. Typical of such reduction catalysts are Raney nickel, cobalt, palladium, platinum, ruthenium, rhodium, osmium, iridium, iron, including salts and oxides thereof and the like. Further, such catalysts can be in their free metal state or extended on a support such as charcoal, aluminum, kieselguhr and the like.

The amount of catalyst employed in the reduction may vary widely. Generally, however, the amount of catalyst will vary from about 1 to 30 weight percent, preferably from about 5 to 10 weight percent.

The process of reducing the aminotrinitrile has been described as a batch operation carried out in a high pressure stirred autoclave. However, other reducing modes will give equally good results. A continuous flow reactor may be used with suspended or fixed bed solid catalyst operating at the proper temperature, pressure, and flow rate to give the desired reduction. Alternatively, the desired reduction can be accomplished by incremental addition of the aminotrinitrile to a batch type reactor at the proper described operating conditions.

One particularly important use for the novel compounds of the present invention is their use as epoxy curing agents for polyepoxides. The polyepoxides which can be cured at elevated temperatures using the amino compounds as herein described are those polyepoxides possessing at least two

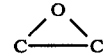

groups. These groups may be terminal, i.e.,

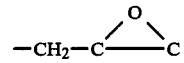

groups, or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art.

The curing of the polyepoxides with the above-described amino compound curing agents of the present invention may be accomplished by simply mixing the two components together. While the reaction between the two components may occur slowly at room temperature, improved results can be obtained if the mixture is heated to a temperature of from about 50° C. to about 280° C. for a period of time of from about 1 to about 12 hours and thereafter post-curing the reaction product for an additional period of time from about 1 to about 8 hours at a temperature of from about 140° C. to about 225° C. With a small casting, curing of the reaction mixture can be obtained by heating the reaction mixture for about 2 hours at a temperature of from about 80° C. to about 100° C. and thereafter post-curing the reaction product at a temperature of from about 140° C. to about 225° C. for an additional 2 hours or so.

In curing polyepoxides it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the novel amino compound curing agent by evaporation before and/or during the curing of such polyepoxide composition can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ethers of ethylene glycol and chlorinated hydrocarbons, such as chloroform.

In addition to the use of the amino compounds of the present invention as epoxy curing agents, many other uses can readily be envisioned by those skilled in the art. Thus, not only do the compounds of the present invention find utility as epoxy curing agents but such compositions can be employed as oil and fuel adductive intermediates. Further, the polyamines may be employed for the formation of polyisocyanate compositions for the incorporation into polyurethane compositions, and the compound may be further reacted to form novel and useful polyamides.

In order to more fully describe the preparation and use of the novel compounds of the present invention the following examples are given. However, such examples are presented for illustration only and are not to be construed as unduly limiting the scope of the present invention. Unless otherwise indicated, all parts and/or percentages given in these examples are by weight.

EXAMPLE 1

In a two liter stirred autoclave was charged 193 gms. of bis(-2-cyanoethoxy)-N-(-2-cyanoethyl)diethanolamine, 422 gms. of tetrahydrofuran (THF), and 30 gms. of 5 percent ruthenium on alumina. The autoclave was pressure checked to 2000 psi with hydrogen for leaks. Afterwards, 160 gms. of liquid ammonia was charged. The pressure was then adjusted to 400 psi with hydrogen gas and the autoclave was heated to 125°–130° C. where a pressure of 1600–1700 psi developed. Samples were pulled from the autoclave and analyzed until the reaction was near completion. After 1½ hours at 125°–130° C., the reaction was post-heated at 145°–150° C. for an additional 15 minutes. The autoclave was then cooled and the contents were emptied. The excess ammonia, THF, and any N-propylamine were removed from the product under vacuum (15–30 mmHg) to give a colorless liquid. An IR spectrum of the final stripped bis(-3-aminopropoxy)-N-(-3-aminopropyl)diethanolamine indicated that all the nitrile groups had been reduced. A potentiometric titration of the product with 1 NHCl resulted in a neutralization equivalent of 14.19 milliequivalents of HCl per/gm of product. The theoretical value for bis(-3-aminopropoxy)-N-(-3-aminopropyl)diethanolamine (MWT=276 g/mole) was calculated to be 14.47 milliequivalents of HCl per gm. of tetramine which is in good agreement with the observed experimental value.

EXAMPLE 2

In a two liter stirred autoclave was charged 250 gms. of bis(-2-cyanoethoxy)-N-(-2-cyanoethyl)diethanolamine, 540 gms. of toluene and 200 gms. of wet Raney No. 28 nickel catalyst (100 gms. on dry basis). The autoclave was pressure checked to 2000 psi with hydrogen for leaks. Afterwards, 200 gms. of liquid ammonia was charged. The pressure was then adjusted to 400 psi with hydrogen gas and the autoclave was heated to 125°–130° C. where a pressure of 1600–1700 psi developed. Samples were pulled from the autoclave and analyzed until the reaction was near completion. After 30 minutes at 125°–130° C., the reactor was post-heated at 145°–150° C. for an additional 15 minutes. The autoclave was then cooled and the contents were emptied. The excess ammonia, toluene, and any n-propylamine were removed from the product under vacuum (15–30 mmHg) to give a colorless liquid. An IR spectrum of the final stripped bis(-3-aminopropoxy)-N-(-3-aminopropyl)-diethanolamine indicated that all the nitrile groups had been reduced. A potentiometric titration of the product with 1 NHCl resulted in a neutralization equivalent of 13.90 milliequivalents of HCl per 1 gm. of product (theoretical value 14.47 milliequivalents per gm).

EXAMPLE 3

To five beakers each containing 100 parts of epoxy resin based on diglycidyl ether of bisphenol A (n=0.2, WPE=185–195) were added the corresponding

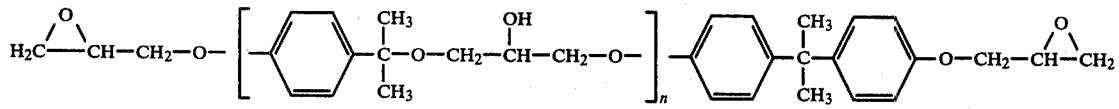

parts of bis(-3-aminopropoxy)-N-(-3-aminopropyl)diethanolamine prepared in Example 1: 23.1 parts, 24.1 parts, 25.1 parts, 26.1 parts, and 27.1 parts. After mixing each beaker thoroughly for 2 minutes and centrifuging at a speed of 3000 rpm, these resin mixtures were placed in aluminum molds and were cured for 2 hours at 80° C. and for another 2 hours at 150° C. The crosslinked products had glass transition temperatures measured with a differential scanning calorimeter (Perkin Elmer Model DSC-2) as are summarized in the table below.

| Glass Transition Temperature For Bis(-3-Aminopropoxy)-N-(-3-Aminopropyl)diethanolamine | | |
|---|---|---|
| Entry | PHR | TG(°C.) |
| 1 | 23.1 | 98.6 |
| 2 | 24.1 | 100.3 |
| 3 | 25.1 | 98.3 |
| 4 | 26.1 | 97.8 |
| 5 | 27.1 | 93.3 |

What is claimed is:

1. An epoxy resin composition comprising an epoxy resin and at least one epoxy resin curing agent of the formula:

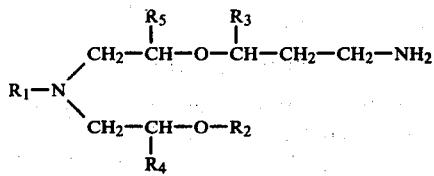

wherein $R_1$ and $R_2$ are selected from H or

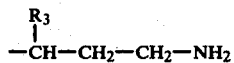

and $R_3$, $R_4$ or $R_5$ are all independently selected from H and a lower alkyl group having from 1 to about 6 carbon atoms.

2. The epoxy resin composition of claim 1, wherein said

groups are terminal groups.

3. The epoxy resin composition of claim 2, wherein said epoxy resin is a diglycidyl ether of bis-phenol.

4. The epoxy resin composition of claim 1, wherein said epoxy resin curing agent is represented by the formula set forth in claim 3 and wherein $R_1$ and $R_2$ are $$-\overset{R_3}{\underset{|}{CH}}-CH_2-CH_2-NH_2$$

5. The epoxy resin composition of claim 4, wherein $R_3$ is H.

6. In a method for curing an epoxy resin composition comprising incorporating an epoxy resin curing agent into an epoxy resin and heating the combination of the epoxy resin and the epoxy curing agent, the improvement which comprises said epoxy resin curing agent being represented by the formula:

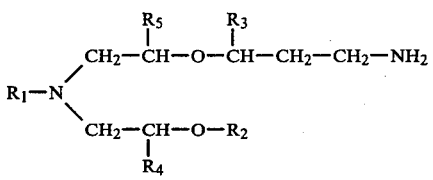

wherein $R_1$ and $R_2$ are selected from H or

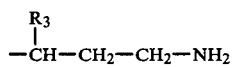

and $R_3$, $R_4$ or $R_5$ are all independently selected from H and a lower alkyl group having from 1 to about 6 carbon atoms.

* * * * *

UNITED STATES PATENT OFFICE
CERTIFICATE OF CORRECTION

Patent No. 4,352,920   Dated October 5, 1982

Inventor(s) Edward W. Kluger

It is certified that error appears in the above-identified patent and that said Letters Patent are hereby corrected as shown below:

Column 7, line 31, change "3" to --1--.

Signed and Sealed this

Twelfth Day of July 1983

[SEAL]

Attest:

Attesting Officer

GERALD J. MOSSINGHOFF

Commissioner of Patents and Trademarks